United States Patent [19]
Voinea

[11] 3,882,311
[45] May 6, 1975

[54] FILM FOR COLOR RADIOGRAPHS

[75] Inventor: Vasile Voinea, Bucharest, Romania

[73] Assignee: Spitalul de Copii "Calarasi", Bucharest, Romania

[22] Filed: Sept. 11, 1972

[21] Appl. No.: 288,084

[30] Foreign Application Priority Data
Sept. 9, 1971 Romania................................ 68172
July 25, 1972 Romania................................ 71745

[52] U.S. Cl.................................. 250/472; 250/475
[51] Int. Cl. ............................................ G03b 41/16
[58] Field of Search......................... 250/65 F, 65 R

[56] References Cited
UNITED STATES PATENTS
| | | | |
|---|---|---|---|
| 2,509,766 | 5/1950 | Gross................................ | 250/65 F |
| 2,931,904 | 4/1960 | Fine.................................. | 250/65 F |
| 3,061,722 | 10/1962 | Mettelstaedt..................... | 250/65 F |

*Primary Examiner*—James W. Lawrence
*Assistant Examiner*—C. E. Church
*Attorney, Agent, or Firm*—Karl F. Ross; Herbert Dubno

[57] ABSTRACT

The present invention deals with a black-white or color film for photography, radiography and defectoscopy, that yields radiological images in a variety of colors, using the classical apparatus for radiodiagnostic activity. The film consists of a transparent supporting pellicle having on one of its sides a radiosensitive color polychromatic stratum, made of several coatings, each of different color and radiosensitivity; the other side is covered by reversible and also polychromatic stratum, also made of several reversible strate of different, each of them having different colors and radiosensitivity.

The characteristic feature of this film is that one or more of its strata contain fluorescent or phosphorescent species, that will by excitation, either enforce the luminosity of the basic color or will emit different colors thus modifying the color ratio and producing different images, so that the film can reveal different elements of the same image.

2 Claims, 2 Drawing Figures

FILM FOR COLOR RADIOGRAPHS

The present invention relates to photographic, radiographic and defectoscopic films in white-black or color that provide color photographs and radiographs using, for the purpose, the apparatus now employed for radiodiagnostics.

For chromo-radiographs there are known theradiographic films constituted of a supporting pellicle, covered by radiosensitive layers, one of the two layers being normally radiosensitive and of one color, and the other radiosensitive layer being of another color.

This film has the drawback that it is highly limited in versatility and information transmittal.

The X-ray color film, according to the present invention, eliminates the above drawbacks in obtaining radiological images in a variety of colors. The film is made of a transparent supporting pellicle, one of the faces of which is coated by a polychromatic color radiosensitive layer and the other face is coated by a reversible polychromatic layer, the radiosensitive polychromatic layer being consituted of several strata, each of them of another color and of a different radiosensitivity, the reversible polychromatic coat being made of several reversible coatings, too, each of them having a different color and being of different radiosensitivity.

The fluorescent and phosphorescent species are included in the color emulsions of one or several of the film coatings so that upon excitation, they will emit either the same colors as the photographic material color in which they are received, enforcing, in this way, the brightness of the basic color, or emit a different color not the colors of the basic photographic material, so that upon excitation, the color ratio of the photographic and fluorescent materials will change as to allow obtaining various images before and during the excitation, so that either by simultaneous or successive irradistion of film by several rays of different penetration capacity, the phosphorescent or fluorescent substances of various colors contained in different coatings or in a single coating can be selectively excited, depending on the pursued effect, thus different elements of the same image in various combinations could be successively or simultaneously revealed, some of them being made visible through discontinuous irradiation to create blinking effect.

In the drawing

Figure 1:
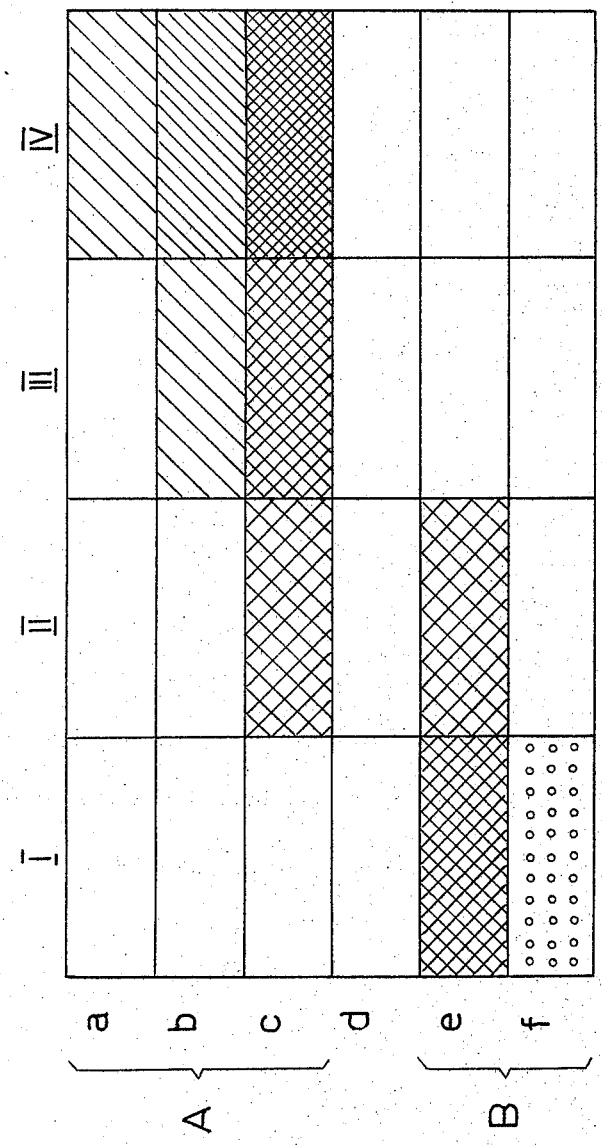
FIG. 1 is a developed view of the chromatic structure of the film.
Figure 2:
FIG. 2 shows the final image, after developing.

The color radiographic film, according to the invention, is constituted of a polychromatic color coating A, made up of a blue layer $a$ having low radiosensitivity, a red layer $b$ having a little higher radiosensitivity, and a yellow layer $c$ of high radiosensitivity.

The radiosensitive coating A is fastened on a transparent supporting pellicle $d$.

The second radiosensitive color coating B is provided on the other face of the film.

This is also polychromatic and reversible and is made of a yellow reversible layer $e$ with a very high radio sensitivity and a blue reversible layer $f$, with a rather reduced radio sensitiveness.

A radiological color image on such a material may be obtained as follows:

Assume the film is exposed over columns I–IV respectively coresponding to the osseous muscular and cellular hypodermic tissues, and to the uncovered part of the examined organ.

In the IV column where the film is uncovered by the examined organ, the X-rays register on the yellow layer $c$, with the highest sensitiveness the red layer $b$ with relatively high sensitiveness and even the blue layer $a$, with reduced sensitiveness.

In the III-$d$ column where the film is covered by the hypodermic cellular tissue, the X-rays will impress only yellow layer $c$ with the highest radiosensitivity and the read layer $b$ with medium radio sensitiveness.

In the second column, where the film is covered by the muscular tissue, the X-radiations of low intensity reach and impress only the yellow layer $c$ with the highest radiosensitivity also the reversible yellow layer $e$.

In the first column, where the film is covered by the osseous tissue and that is not practically affected by the X-radiations, both the reversible yellow layer $e$ and the reversible blue layer $f$ will be effective.

After developing, the final image $g$ ia obtained, where, in the first column, it will be the total of the blue and yellow colors or green, the II$d$ column will be yellow, the 3-$d$ column will represent the total of yellow and red, resulting in orange, and in the IV-$th$ column there will be the total or the yellow, red and blue, giving brown.

Since the different color coatings will have different radiosensitivity, both on the negative and on the positive coating, a polychrome image will result, after a single exposure in the X-rays.

In multiplying the strata, wich would have different colours brightness, saturations and radiosensitivity one can reach, by means of single exposure practically an unlimited number of tones saturations and brightness.

The second example concerns the achievement of a fluorescent radiographic image, by including a fluorescent species in one of the film layers according to the first realization example.

The first film has the possibility of transforming the opacities of various intensities in different colors. For instance, the high intensity opacities in a pulmonary radiography, as the ribs and calcareous opacities, would appear respectively green or blue, while infiltrative pulmonary lesions would be red colored and contain fluorescent species, too.

In the red layer emulsion of the film, during the manufacturing a fluorescent substance is included, which will emit, by excitation, also bright radiations of red color, which, after the development of the film, remain on the support layer in the same places as the red dyestuff.

Consequently, in the infiltrative lesion parts the film will be colored red and will contain fluorescent substances, too.

Above this opacity, the intensive shadows of the ribs and of verious calcifications would overlap, thus disturbing the essential interpretation of pulmonary infiltrative lesions.

In order to eliminate this inconvenience, the fluorescent color film must be examined on a negatoscope, wich contains white-light and UV-radiation sources, both having separatedly adjustable intensity.

In the very moment of the film examination at a white light lamp, the red infiltrate will appear, over which the blue and green colored ribs and calcarous opacities will superpose an intensive image. If the bright intensity of the negatoscope is reduced, all opacities would appear more dark and more difficult to interpret.

Meanwhile the negatoscope UV-radiation source is switched on, and due to the red matter fluorescence, it illuminates only the infiltrate in bright red, without being disturbed by the high opacity of the other tissues, that would be colored in blue and green, without containing any fluorescent species.

The intermittent UV-radiations projected on the film will lead to a blinking effect of the pulmonary lesions, which appear in red, thus allowing to reveal the little lesions, which in continuous light are not revealed.

According to another embodiment, a fluorescent species is included in the red and yellow coatings of the photographic material, while the blue stratum has no fluorescent substance. In this example the fluorescent substances will illuminate at the time of excitation, with the same color, but more intensively in respect to the basic photographic material.

With the aid of this material one could take a photo of a woman dressed in a red cloth with a range of yellow tones and a blue overcoat.

The first photo is taken when the woman being dressed in her blue overcoat, using a set of filters which would allow such a color combination to impress exclusively the blue color of the film.

After removing her overcoat, the woman remains in her dress, a new photo will be taken in the same position, but, this time, with a set of filters which permit to impress the red and the yellow colors of the film, i.e. those colors, which, besides the dyestuff, have fluorescent species too.

If the photo is looked at white light, the blue color intensity being a little higher than the red and yellow colors intensties, the woman would appear dressed in her blue overcoat.

But, if the photo is illuminated with a UV-radiation source, $\alpha, \beta, \gamma$-radiations, X-radiation or strong white-light which have gradually more and more higher intensities, the red and yellow layers fluorescence would appear, and on the image the woman remains gradually dressed with her red dress with yellow tones, bright, fluorescent, while the unfluorescent color of the overcoat gradually disappears, because of the fluorescent coating brightness.

The fluorescent photographic material, according to the present invention, might be used for two or three images, that appear successively at a moderate light-one image, and at a strong light or irradiation another image would appear.

The image may be obtained as well by the drawing or painting of several images, in that one or more colors would also contain fluorescent species.

I claim:

1. A radiographic film for color portrayal of an image, comprising a radiation-transparent support layer, a high radiosensitivity first layer of one of the primary colors on one side of said support layer, a moderate radiosensitivity second layer on said high radiosensitivity layer and of a second primary color, a low radiosensitivity layer on said moderate radiosensitivity layer and of a third primary color, a reversal layer providing one of said primary colors in the absence of irradiation through said support layer and coated onto the other side thereof, said reversal layer having a high radiosensitivity, and another reversal layer of another of said primary colors and a reduced radiosensitivity on the first-mentioned reversal layer.

2. The film defined in claim 1 wherein at least one of said layers other than said support layer contains a phosphorescent or fluorescent material activated by radiation applied to said film.

* * * * *